United States Patent Office

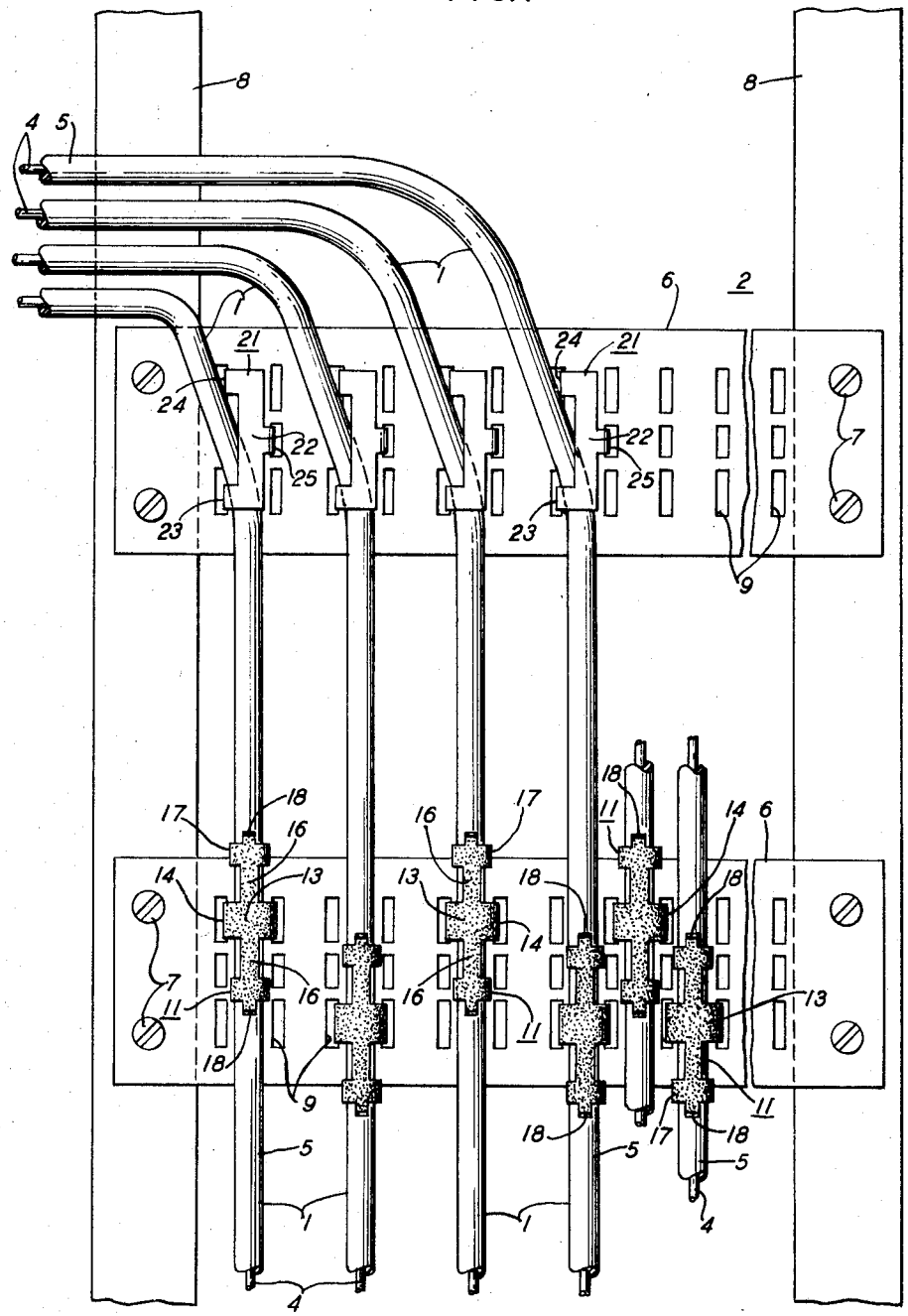

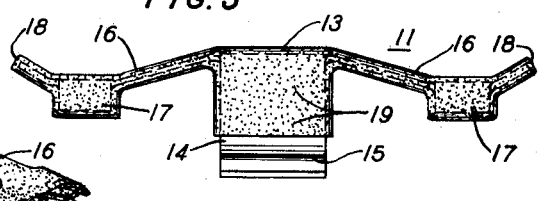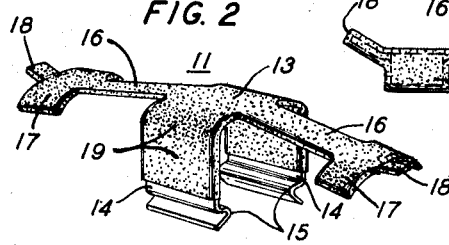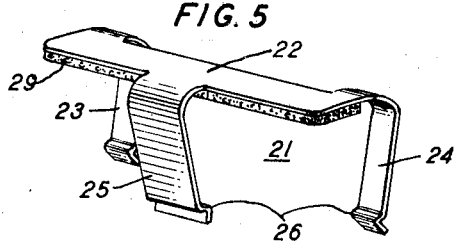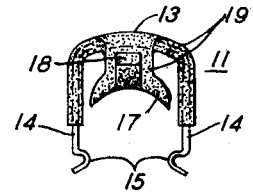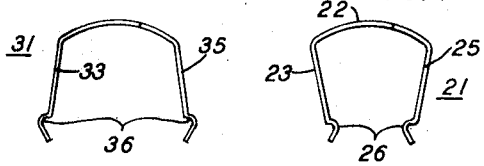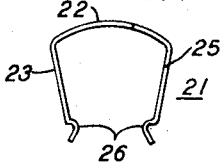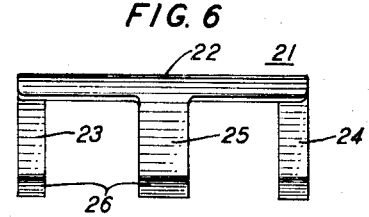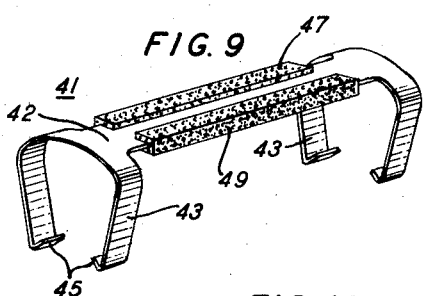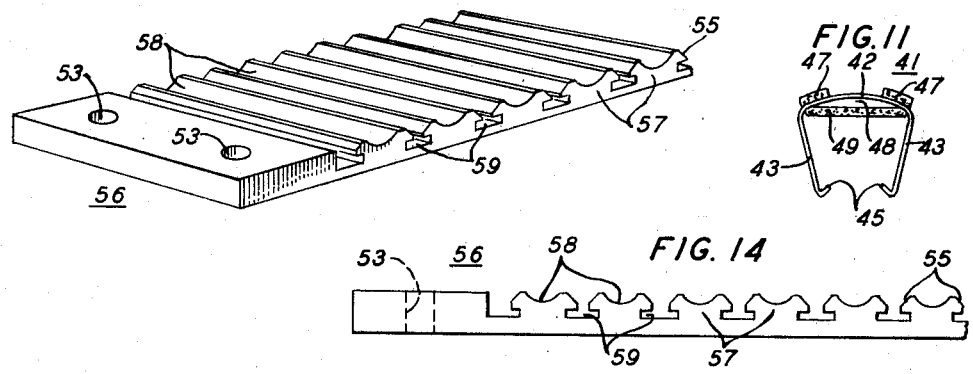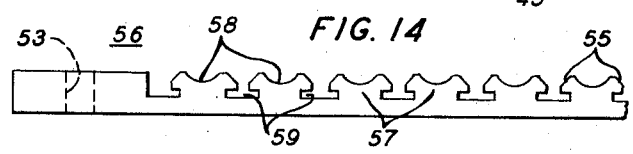

3,508,730
Patented Apr. 28, 1970

3,508,730
CABLE SECURING CLIP
John Knezo, Jr., Cranford, N.J., assignor to Bell Telephone Laboratories, Incorporated, Murray Hill and Berkeley Heights, N.J., a corporation of New York
Filed Dec. 20, 1967, Ser. No. 692,229
Int. Cl. F16l 3/04
U.S. Cl. 248—73       3 Claims

ABSTRACT OF THE DISCLOSURE

A cable securing clip for holding a deformable cable without distortion thereof and comprising a central portion for straddling a cable without applying pressure thereto and two end portions that are bent for applying a predetermined degree of pressure to a cable. A modification has an arm at each end of one side of the clip and a third arm at the middle of the other side for mounting diagonally across a cable. Another modification of the clip has U-shaped arms at each end and a central resilient section for pressing against a cable.

BACKGROUND OF THE INVENTION

This invention relates to cable securing clips and, more particularly, to improved cable securing clips for holding a deformable cable, such as an electric coaxial cable, without distortion thereof.

In general, a variety of clips, hooks, and hangers have been designed for securing elongated members, such as cables, wires, pipes, and conduits, to various types of structures. Some of these securing devices are used for holding an elongated member in a desired position with respect to a horizontal structure, such as a shelf or ceiling, and consequently do not need to exert any pressure upon the elongated member but only a certain degree of restraint. Other types of securing devices are used for attaching an elongated member to a vertical structure, such as a wall or post. In this type of installation, the weight of the elongated member is usually supported, at least in part, due to pressure exerted by the securing devices which, in effect, squeeze the elongated member against the vertical structure.

When the last-mentioned type of installation is used with an electric coaxial cable, a problem arises because of the deformable nature of its outer coaxial conductor. As is well known in the art, an electric coaxial cable comprises an inner conductor surrounded by a tubular outer conductor which is equidistantly spaced apart from the inner conductor so as to be concentric or coaxial therewith. Various types of spacing means are interposed between the two conductors throughout the length of the cable to insure that the equidistant spacing between the two conductors is maintained. Since the tubular outer conductor is relatively thin, it is deformable and will become dented or distorted when excessive pressure is applied to it. Such dents or distortions are objectionable because they produce impedance discontinuities which are undesirable as they change the electric characteristics of the cable.

When any appreciable length of electric coaxial cable is to be installed in a vertical position, it should not be supported solely by suspending it at a point near the upper end of the cable because the weight of the cable will cause the outer conductor to stretch and slip with respect to the inner conductor thereby disturbing the electric transmission characteristics of the cable. For this reason, the cable should be supported by appropriate securing devices. These devices must be so installed as to apply precisely the proper degree of pressure to the cable. If insufficient pressure is applied, then the cable will not be held firmly and will slip through the securing devices. If too much pressure is applied, then the cable will be deformed or dented thereby producing impedance discontinuities.

SUMMARY OF THE INVENTION

The present invention is designed to solve the problem of providing cable securing devices which will apply sufficient pressure for supporting an electric coaxial cable in a vertical position but not enough pressure to distort the outer coaxial conductor of the cable. In accordance with one embodiment of this invention, a cable securing clip is constructed with a central body portion provided with a downward depending arm on each side thereof. This pair of arms is formed approximately in a U-shape. The bottom end of each arm is crimped for engaging one edge of a slot in an associated supporting means. The lengths of the arms and the spacing between them is made sufficient to enable them to straddle a cable without applying any significant pressure to it.

The clip also includes an extended end portion or wing formed at each end of the central body portion. These wings are somewhat resilient and they are bent downward for applying a predetermined pressure to a cable over which the clip is mounted. The wings have flanges curving downward on each side thereof for engaging the outer conductor of a coaxial cable. If desired, these flanges and other parts of the clip can be covered with a protective coating as is explained hereinafter.

As this embodiment of the invention is intended to be mounted with its elongated body member parallel to the longitudinal axis of a cable, a modified form of the clip is designed to be mounted diagonally across a cable. In this second embodiment of the invention, the elongated body member of the clip is formed with a downward extending arm at each end of one side of the body member. A third downward extending arm is formed at the middle of the other side of the body member. The lengths of the arms are selected to be such that the clip will apply the proper degree of pressure to a cable when the clip is mounted on a supporting surface.

Another embodiment of the invention provides a pair of U-shaped arms at each end of the elongated body member. The intermediate portion of the body member is provided with resilient means adapted for pressing against a cable which is straddled by the two pairs of U-shaped arms. Different degrees of pressure can be obtained by shortening or lengthening the U-shaped arms.

Cable securing clips made in accordance with this invention having the advantage of being capable of quick installation without the necessity of using any special tools. Another advantage is that no special pressure-testing devices are required for determining whether the clips are applying the proper degree of pressure to a cable because the application of the desired pressure is obtained by means of the novel design of these clips. This novel design also enables the clips to be mounted closely together so that a considerable number of cables can be attached to the supporting means.

BRIEF DESCRIPTION OF THE DRAWING

The features of this invention are fully discussed hereinafter in relation to the following detailed description of the drawing in which:

FIG. 1 is a front view of a cable supporting framework having a plurality of electric coaxial cables mounted thereon by means of cable securing clips made in accordance with this invention;

FIG. 2 is a perspective view of a cable securing clip representing one embodiment of this invention;

FIGS. 3 and 4 are side and end views, respectively, of the cable securing clip that is illustrated in FIG. 2;

FIG. 5 is a perspective view of a cable securing clip embodying a different form of the invention;

FIGS. 6 and 7 are side and end views, respectively, of the cable securing clip that is shown in FIG. 5;

FIG. 8 is an end view of a cable securing clip that is a modification of the clip represented in FIG. 7;

FIG. 9 is a perspective view of a cable securing clip embodying another form of the invention;

FIGS. 10 and 11 are side and end views, respectively, of the cable securing clip shown in FIG. 9;

FIG. 12 is a side view of a cable securing clip that is a modification of the clip illustrated in FIG. 10;

FIG. 13 is a perspective view of an alternative type of clip support which can be mounted on the framework that is illustrated in FIG. 1; and FIG. 14 is a side view of the alternative clip support that is shown in FIG. 13.

DETAILED DESCRIPTION

In the exemplary embodiment of the invention that is shown in FIG. 1, a plurality of electric coaxial cables 1 are mounted on a vertically disposed supporting framework 2 by means of a number of cable securing clips. As is represented in FIG. 1, each of the coaxial cables 1 comprises an inner conductor 4 surrounded by a tubular outer conductor 5 which is concentric therewith. The framework 2 includes a series of transversely disposed supporting members 6 which are attached by any convenient means, such as bolts 7, to a pair of vertically disposed members 8. Each of the transverse members 6 is provided with a number of holes or slots 9 formed therein at spaced intervals and arranged in a series of columns with each column consisting of three of the slots 9.

Various forms of the cable securing clip of this invention may be used for attaching the coaxial cables 1 to the supporting framework 2. For example, one embodiment of the clip may be used for holding the cables 1 when they are disposed parallel to the vertical members 8, and a different embodiment of the clip may be used advantageously when the cables 1 are arranged diagonally across the front surface of one of the transverse members 6.

An example of the first embodiment of this invention is the cable securing clip 11 that is shown in FIGS. 1, 2, 3, and 4. This clip 11 is constructed with a central body portion 13 which is provided with a downward depending arm 14 on each side thereof. The central portion 13 is slightly curved, as is best seen in FIG. 4. Thus, the central portion 13 and its arms 14 form an approximate U-shape. The bottom end of each of the arms 14 is crimped, as is indicated by the reference numeral 15, for engaging an edge of one of the slots 9 in the transverse supports 6. The lengths of the arms 14 and the spacing between them is made sufficient to enable the central portion 13 of the clip 11 to straddle a cable 1 without applying any significant pressure to the cable 1.

Each end of the clip 11 is constituted by an extended end portion or wing 16 having a flange 17 formed on each side thereof. These wings 16 are resilient and they are bent downward at a slight angle so as to adapt them for applying a predetermined degree of pressure to a cable 1 over which the clip 11 is mounted. The end tips 18 of the wings 16 are curved upward to prevent them from marring or gouging the surface of a cable 1. The upward curve of the tips 18 also facilitates the removal of a clip 11 after it has been installed over a cable 1. As is illustrated in the drawing, each of the flanges 17 curves downward for engaging the cylindrical surface of a cable 1.

If desired, the clip 11 may be provided with a relatively soft coating 19 which functions to provide a better frictional engagement for holding a cable 1. The coating 19 also serves as an isolating insulation and, in addition, reduces abrasion of the cable 1 which might otherwise be caused by rubbing or chafing against the clip 11.

In using the clips 11 to secure the cables 1 to the vertically disposed framework 2, one of the cables 1 is first manually held between two columns of the slots 9. One of the clips 11 is then placed over the cable 1 with the arms 14 on each side of the cable 1 so that the clip 11 is straddling the cable 1. The bottom ends of the arm 14 are pushed into the slots 9 thereby forcing the crimped ends 15 to engage the edges of the slots 9. This produces a gripping action due to the fact that the spacing between the ends of the arms 14 is somewhat less than the spacing between the columns of slots 9.

Thus, the clip 11 will be securely attached to the transverse member 6 of the framework 2. However, as was stated above, the lengths of the arms 14 are such that the middle portion 13 of the clip 11 does not apply any significant pressure to the cable 1. Instead, pressure is applied to the cable 1 by the wings 16 which are bent downward by an amount that is calculated to apply a desired predetermined degree of pressure to the cable 1. Since the side flanges 17 of the wings 16 are curved, they will grip the cable 1 and prevent it from slipping out of engagement with the wings 16.

As is indicated in FIG. 1, when the cables 1 and the clips 11 are mounted across the front of one of the transverse supports 6 in the framework 2, it is convenient to alternate the positions of the clips 11 so that the arms 14 of one clip 11 will engage the slots 9 in the top row while the arms 14 of the next adjacent clip 11 engage the slots 9 in the bottom row. It should be noted that the spacing between the clips 11 which are attached to the left portion of the transverse support 6 has been made wide for the purpose of obtaining clarity in the drawing.

Actually, the design of the clips 11 is such that their requirements in respect to space are very economical. This is demonstrated by the clips 11 that are mounted on the right portion of the transverse support 6. Here it can be seen that the top slot 9 in one column receives a leg 14 of one clip 11 while the bottom slot 9 in the same column admits a leg 14 of a different clip 11. In other words, a leg 14 on one side of a clip 11 is mounted in the same column of slots 9 as a leg 14 on the opposite side of the next adjacent clip 11. This enables the clips 11 and the cables 1 to be mounted very closely together so that a considerable number of cables 1 can be secured to the transverse support 6.

There are occasions when it is desirable to employ clips which can be mounted diagonally across the cables 1, such as when the cables 1 are to be positioned at right angles to the vertical axis of the framework at points shortly above a location where they are arranged diagonally across the front of one of the transverse supports 6 as is shown in the upper portion of FIG. 1. A clip designed for this purpose is shown in FIGS. 5, 6, and 7 wherein it can be seen that the clip 21 has an elongated body portion 22 formed with a pair of downward extending arms 23 and 24 that are positioned at opposite ends of one side of the body portion 22. A third downward extending arm 25 is formed at the middle of the opposite side of the body portion 22. The bottom end of each of the arms 23, 24, and 25 is crimped, as is indicated by the reference numeral 26, for engaging an edge of one of the slots 9. If desired, the bottom surface of the body portion 22 has a pad 29 of any suitable soft and resilient material, such as sponge rubber, attached thereto by any convenient means, such as an appropriate adhesive. This pad 29 is shown in FIG. 5 but has been omitted from FIGS. 6 and 7 for the purpose of obtaining clarity in the drawing.

When the clip 21 is to be used, one of the cables 1 is first manually held in the desired diagonal position across the front surface of one of the transverse supports 6. The clip 21 is then made to straddle the cable 1 with the pad 29 pressing against the cable 1 which bears lightly against the inner surface of one arm 23 and the outer surface of another arm 24. The bottom ends of these two arms 23 and 24 are inserted, respectively, into the bottom and top slots 9 of one column of three of these slots 9. The bottom end of the third arm 25 is next inserted into the middle slot 9 of the group of slots 9 in an adjacent column. Since the lower portions of the arms 23, 24, and 25 are bent inward to produce a spacing that is less than the spacing between the columns of slots 9, their crimped ends will produce a gripping action which will securely hold the clip 21 and its engaged cable 1.

A somewhat different clip 31, shown in FIG. 8, may be employed alternatively. This clip 31 is similar to the clip 21 except that the bottom portions of its three arms are bent outward, as is illustrated by the arms 33 and 35 in FIG. 8, to effect a spacing which is greater than the spacing between the columns of slots 9. The bottom ends of these arms 33 and 35 are crimped, as is represented by the reference numeral 36, but in a manner that is the opposite of that indicated in FIG. 7. This construction functions to hold the clip 31 and an engaged cable 1 securely against the transverse supporting member 6.

The clips 21 and 31 are each designed to hold the cables 1 by means of a clamping action which is produced by selecting the lengths of their arms to be such that, when the cables 1 and the clips 21 and 31 are mounted on the horizontal support 6, each of the cables 1 will be gently pressed between the surface of the support 6 and the inner surface of the body portion of the respective clip 21 or 31. Thus, by properly designing the lengths of the arms of the clips 21 and 31, the resilient pads 29 will apply the desired degree of pressure to the cables 1 for securely holding them against the transverse support 6. Both this pressure and the force applied to the edges of the slots 9 can also be varied by changing the thickness and width of the arms and the body portion of the clips.

It is to be noted that, although the clips 21 and 31 are intended primarily to be mounted diagonally across the cables 1, they can also be mounted with their elongated body portions parallel to the longitudinal axis of a cable 1 in essentially the same manner as the clips 11 shown in the lower portion of FIG. 1.

Instead of using the resilient pad 29, the clips 21 and 31 can be provided with a protective coating similar to the coating 19 on the clip 11. Alternatively, protection of the cables 1 can be obtained by using a short sleeve of a suitable soft and resilient material, such as sponge rubber. When such as sleeve is split lengthwise, it can be readily placed upon a cable 1 and can be moved along the cable 1 to the position where it will be engaged by either the clip 21 or 31. In addition, to protecting the cable 1 from abrasion that might otherwise be caused by the clips 21 or 31, this sleeve also acts as an isolating insulation and provides good frictional engagement for holding a cable 1.

In another embodiment of the invention, a resilient pad 49 is mounted on a cable securing clip 41 as is illustrated in FIGS. 9, 10, and 11. This clip 41 comprises an elongated body portion 42 having a pair of arms 43 extending downward at each end thereof. It can be seen in FIGS. 9 and 11 that the cross-sectional area of the body portion 42 is slightly curved so that it, together with the arms 43, forms a U-shape. The ends of the arms 43 are bent inward as is indicated by the reference numeral 45, for engaging edges of the slots 9. Since the spacing between the ends of the arms 43 is less than the spacing between the columns of slots 9, the arms 43 will provide a gripping action for securely holding the clip 41 on the transverse support 6. As the pressure exerted by the clip 41 upon a cable 1 is dependent upon the lengths of the arms 42, this pressure can be varied by changing the lengths of the arms 42.

The pad 49 is made of any suitable soft or resilient material, such as sponge rubber. The sides of the pad 49 are formed in the shape of flanges 47. As is shown in the drawing, the pad 49 is mounted under the body portion 42 with the flanges 47 gripping the top surface of the body portion 42.

It should be noted that, due to the curvature of the cross-sectional area of the body portion 42 its bottom surface is concave. Thus, a space 48 is formed between the concave bottom surface of the body portion 42 and the top surface of the pad 49. This space 48 functions as means for receiving therein the pad 49 when it is stretched by the cylindrical surface of a cable 1 that is positioned between the two pairs of arms 43. In other words, when the clip 41 is mounted on a cable 1, the rounded surface of the cable 1 stretches the pad 49 and pushes it into the space 48. If the body portion 42 had been made flat, then this stretching of the pad 49 could not occur. Therefore, the space 48 functions as means for enabling the pad 49 to be stretched. The advantage derived from this stretching of the pad 49 is that it produces a certain degree of tension which functions to provide better frictional engagement so that the clip 41 holds the cable 1 more securely.

FIG. 12 shows a clip 41' which is similar to the clip 41 except that, in the modified clip 41', the middle part of the body portion 42' is curved downward so as to adapt it for exerting a predetermined degree of pressure upon a cable that is straddled by the arms 43'.

The various embodiments of the cable securing clip of this invention are not restricted to being attached only to a slotted transverse support 6 having the specific design that is shown in FIG. 1. For example, the clips can be mounted on an alternative type of transverse support 56 that is illustrated in FIGS. 13 and 14. This support 56 is provided with holes 53 at each end thereof which are adapted to receive the bolts 7 so that it can be fastened to the vertically disposed members 8 of the framework 2 in place of the supports 6.

The support 56 is preferably fabricated by extrusion and is formed with a series of long, parallel, T-shaped slot 59 extending transversely across its front surface. The space between each pair of adjacent slots 59 is occupied by a T-shaped boss 57. Each boss 57 has a trough 58 formed in its surface with a curved cross-sectional contour corresponding to that of a cable 1 so that the cable 1 can be received therein. The upper surfaces of the edges of the bosses 57 are beveled, as is indicated by the reference numeral 55, for facilitating the insertion of the crimped or bent ends of the arms of the clips.

Thus, when one of the cables 1 is placed in one of the troughs 58, any one of the clips 11, 21, 31, or 41 can be placed over the cable 1 and the arms of the clip can be snapped into the T-shaped slots 59 thereby securely holding the cable 1. If desired, the surfaces of the troughs 58 can be provided with a protective coating similar to the coating 19 described above.

It can be understood from the above description that any of the various embodiments of the clip of this invention can be manually attached to the supporting framework 2 without requiring the assistance of any tool or auixilary fastening hardware. It should also be noted that the snap-on mounting action of the clips enables them to be installed quickly. Furthermore, the design of these clips is economical in respect to its space requirements because it enables the clips and the cables 1 to be mounted closely together on the framework 2. Finally, it should be noted that the design of these clips is such as to apply a controlled and uniform pressure to the cables 1 while providing cushioning of the cables 1 for preventing damage from abrasion and for furnishing good frictional clamping characteristics.

What is claimed is:

1. Clamping means for securely holding a cable having two opposite sides,
   said clamping means including a supporting device adapted for supporting a cable diagonally disposed thereon, said supporting device having means defining a plurality of slots formed therein, and a cable securing clip adapted to be mounted diagonally across said cable for clamping said cable against said supporting device, said clip comprising a body portion adapted to be placed diagonally across a cable, said body portion including two sides each having two end portions and a middle portion.

and three members formed integrally with said body portion and extending downward therefrom, each of said members having an inner surface and an outer surface, the first and second ones of said members being positioned at said opposite end portions of one of said sides of said body portion, the third one of said members being positioned at said middle portion of the other of said sides of said body portion, each of said members having its end bent for adapting it for engagement with an edge of a respectively different one of said slots in said slotted supporting device, said first one of said members being adapted for pressing its said inner surface against one side of said cable, and said second one of said members being adapted for pressing its said outer surface against the opposite side of said cable.

2. Clamping means for securely holding a cable, said clamping means including a supporting device adapted for supporting a cable, said supporting device having means defining a plurality of slots formed therein, and a cable securing clip adapted for pressing a cable against said supporting device, said clip comprising a body portion adapted to be mounted over a cable, said body portion including two ends and top and bottom surfaces, each of said ends having two opposite side portions, four members formed integrally with said body portion and extending downward therefrom, the first two of said members being positioned at said opposite side portions of one of said ends of said body portion for forming a U-shape which is adapted for straddling a cable, the second two of said members being positioned at said opposite side portions of the other of said ends of said body portion for forming a U-shape which is adapted for straddling a cable, each of said members having its end bent for adapting it for engagement with an edge of a respectively different one of said slots formed in said slotted supporting device, a resilient rectangular pad adapted for being pressed against a cable straddled by said four members, said pad having a top surface and two side portions, said pad having its said top surface positioned under said bottom surface of said body portion of said clip, said pad having its said side portions provided with flanges adapted for gripping said top surface of said body portion of said clip, said body portion of said clip having a cross-sectional area which is curved for making its said bottom surface concave, at least a portion of said resilient pad being adapted to be stretched when said resilient pad is pressed against a cable straddled by said four members, and said clip further comprising means for receiving said stretched portion of said resilient pad, said last-mentioned means comprising means defining a space formed between said concave bottom surface of said body portion of said clip and said top surface of said resilient pad.

3. Clamping means for securely holding a cable, said clamping means including a supporting device adapted for supporting a cable, and a cable securing clip adapted for clamping a cable against said supporting device, said clip comprising a body portion adapted for covering a portion of a cable, resilient means attached to said body portion and adapted for applying pressure to a cable covered by said body portion, at least two members formed integrally with said body portion and projecting therefrom for straddling a cable covered by said body portion, each of said members having an end that is bent, said supporting device having means defining at least two parallel T-shaped slots formed therein and separated by a T-shaped boss, said bent ends of said members being adapted for insertion into said slots with each of said bent ends being adapted for engagement with an edge of a respectively different one of said slots, and means defining a trough in the surface of said boss, said trough having a curved cross-sectional contour corresponding to that of a cable and adapted for receiving a cable therein, and said body portion of said clip having a longitudinal axis which lies parallel with the longitudinal axis of said trough when said bent ends of said members are inserted in said slots in said slotted supporting device.

References Cited

UNITED STATES PATENTS

| | | | |
|---|---|---|---|
| 2,279,865 | 4/1942 | Ellinwood | 248—71 X |
| 2,283,899 | 5/1942 | Baker | 248—56 |
| 2,541,908 | 2/1951 | Attwood | 248—74 |
| 2,712,917 | 7/1955 | Flora | 248—71 X |
| 2,855,648 | 10/1958 | Jansson | 248—71 X |
| 2,918,240 | 12/1959 | Wiegand | 248—71 |
| 2,467,604 | 4/1949 | Tinnerman | 248—72 X |

CHANCELLOR E. HARRIS, Primary Examiner

U.S. Cl. X.R.

24—73; 174—164; 248—74